United States Patent [19]

Katchka

[11] Patent Number: 5,335,646
[45] Date of Patent: Aug. 9, 1994

[54] WATER HEATER, A BURNER UNIT THEREFOR AND METHODS OF MAKING THE SAME

[75] Inventor: Jay R. Katchka, Cypress, Calif.

[73] Assignee: Robertshaw Controls Company, Richmond, Va.

[21] Appl. No.: 114,135

[22] Filed: Aug. 30, 1993

[51] Int. Cl.⁵ .............................................. F24H 1/00
[52] U.S. Cl. .................... 126/350 R; 126/355; 126/359; 126/39 E; 122/17; 239/122; 239/288.5
[58] Field of Search ............... 126/355, 359, 351, 361, 126/350 R, 99 A, 116 R, 39 E, 51, 39 R, 99 R; 122/14, 16, 17, 19; 239/120, 122, 288, 288.5

[56] References Cited

U.S. PATENT DOCUMENTS

| | | | |
|---|---|---|---|
| 639,478 | 12/1899 | Wilson | 126/355 |
| 2,162,620 | 6/1939 | Larsen | 122/16 |
| 3,124,108 | 3/1964 | Wenczl | 122/17 |
| 4,372,290 | 2/1983 | Visos et al. | 126/355 |

FOREIGN PATENT DOCUMENTS 2368671  5/1978  France .......................... 126/355

OTHER PUBLICATIONS

European Pat. Office; 126/355; Dec. 1985; Vago; No. 0163838.
Prior known control burner unit having aligned drain openings in the plates thereof in offset relation to the central fuel opening thereof.

Primary Examiner—Carl D. Price
Attorney, Agent, or Firm—Candor, Candor & Tassone

[57] ABSTRACT

A water heater, a burner unit therefor and methods of making the same are provided, the water heater comprising a tank for containing water therein and a burner unit for receiving fuel from a source thereof and issuing the fuel therefrom so as to burn and heat the tank and thus the water therein by conduction, the burner unit comprising a top burner plate having a top wall provided with an opening therethrough for draining away water that has accumulated thereon and that comprises condensate that has dripped from the flue of the tank onto the top wall, the opening to be so constructed and arranged that the water that drains therethrough is adapted to pass out through a central opening of the bottom burner plate of the burner unit and through which fuel is directed to the burner unit.

18 Claims, 3 Drawing Sheets

5,335,646

WATER HEATER, A BURNER UNIT THEREFOR AND METHODS OF MAKING THE SAME

BACKGROUND OF THE INVENTION

1. Field of the Invention

This invention relates to a new water heater and to a new burner means for heating the water in the tank of the water heater as well as to a new method of making such a water heater and to a new method of making such a burner means.

2. Prior Art Statement

It is known to provide a water heater comprising a tank for containing water therein and a burner means for receiving fuel from a source thereof and issuing the fuel therefrom so as to burn and heat the tank and, thus, the water therein by conduction, the tank having a bottom wall means and a flue passage extending upwardly from the bottom wall means for conveying away combustion products of the burner means, the burner means comprising a top burner plate and a bottom burner plate secured together and defining a plurality of burner ports disposed around the outer periphery of the plates and a chamber therebetween for receiving fuel therein and issuing the fuel outwardly through the ports, the bottom burner plate having a central opening therethrough for receiving fuel from the source substantially vertically upwardly through the central opening and into the chamber, the top burner plate having a top wall provided with opening means therethrough for draining away water that has accumulated thereon and that comprises condensate that has dripped from the flue passage onto the top wall, the opening means connecting with opening means through the bottom wall and located outboard of the central opening of the bottom burner plate.

SUMMARY OF THE INVENTION

It is one of the features of this invention to provide a new water heater which has unique means for draining away condensate that has dripped from the flue passage of the tank thereof onto the top wall of the top burner plate of the burner means thereof.

In particular, it has been found according to the teachings of this invention that opening means can be provided through the top wall of the top burner plate of the burner means in such a manner that the water that drains through such opening means is adapted to pass out through a central opening of the bottom burner plate of the burner means and through which fuel is directed to the chamber of the burner means.

In this manner, it has been found that such opening means in the top wall of the burner means does not adversely affect the flow of fuel to the ports of the burner means and thereby does not adversely affect the flame pattern of the burner means.

For example, one embodiment of this invention comprises a water heater comprising a tank for containing water therein and a burner means for receiving fuel from a source thereof and issuing the fuel therefrom so as to burn and heat the tank and, thus, the water therein by conduction, the tank having a bottom wall means and a flue passage extending upwardly from the bottom wall means for conveying away combustion products of the burner means, the burner means comprising a top burner plate and a bottom burner plate secured together and defining a plurality of burner ports disposed around the outer periphery of the plates and a chamber therebetween for receiving fuel therein and issuing the fuel outwardly through the ports, the bottom burner plate having a central opening therethrough for receiving fuel from the source substantially vertically upwardly through the central opening and into the chamber, the top burner plate having a top wall provided with opening means there through for draining away water that has accumulated thereon and that comprises condensate that has dripped from the flue passage onto the top wall, the opening means being so constructed and arranged that the water that drains therethrough is adapted to pass out through the central opening of the bottom burner plate.

Accordingly, it is an object of this invention to provide a new water heater having one or more of the novel features of this invention as set forth above or hereinafter shown or described.

Another object of this invention is to provide a new method of making such a water heater, the method of this invention having one or more of the novel features of this invention as set forth above or hereinafter shown or described.

Another object of this invention is to provide a new burner means for such a water heater, the burner means of this invention having one or more of the novel features of this invention as set forth above or hereinafter shown or described.

Another object of this invention is to provide a new method of making such a burner means, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
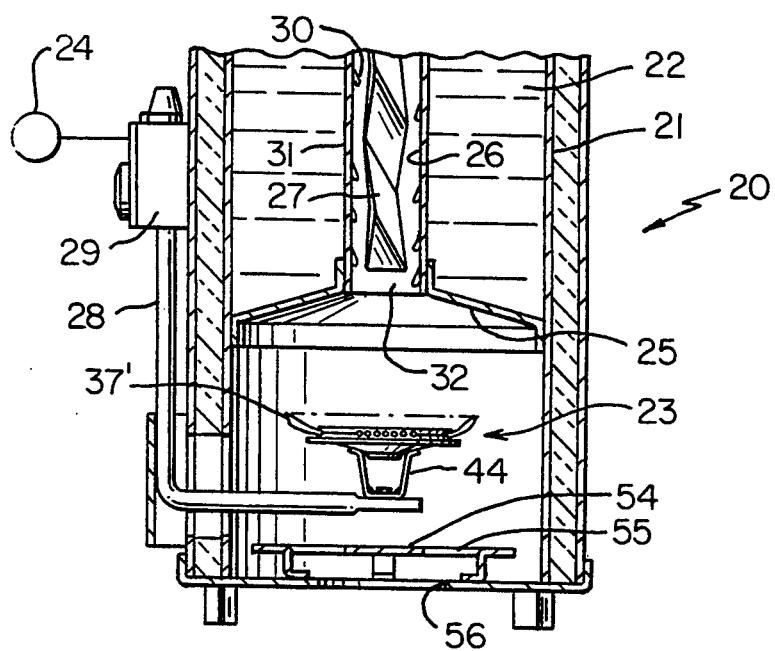
FIG. 1 is a schematic view, partially in cross section, and illustrating the new water heater of this invention.
Figure 2:
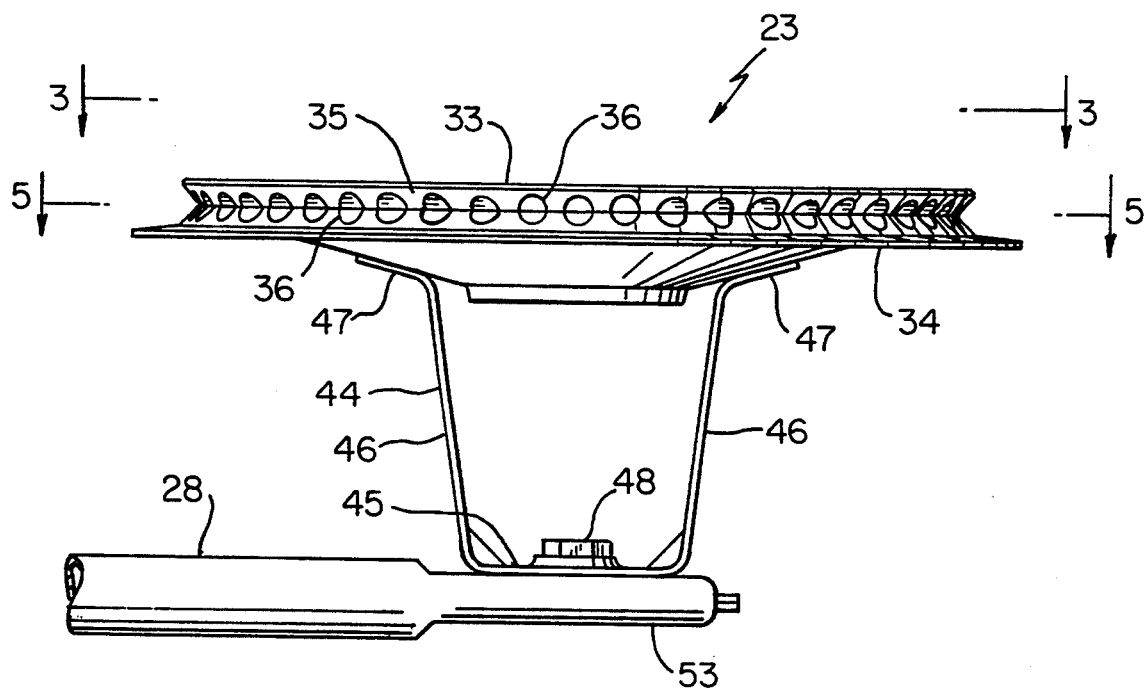
FIG. 2 is an enlarged broken away side view of the burner means of this invention that forms part of the water heater illustrated in FIG. 1.

While the various features of this invention are hereinafter illustrated and described as being particularly adapted to provide a burner means for a water heater tank, it is to be understood that the various features of this invention can be utilized singly or in various combinations thereof to provide a burner means for other apparatus as desired.

Therefore, this invention is not to be limited to only the embodiment illustrated in the drawings, because the drawings are merely utilized to illustrate one of the wide variety of uses of this invention.

Referring now to FIG. 1, the new water heater of this invention is generally indicated by the reference numeral 20 and comprises a tank 21 for containing water 22 therein and a burner means 23 for receiving fuel, such as natural or synthetic gas, from a source 24 and issuing the fuel therefrom so as to burn and heat the tank 21 and, thus, the water therein by conduction in a manner well known in the art.

The tank 21 has a bottom wall means 25 and a flue passage 26 extending upwardly from a central area of the bottom wall means 25 for conveying away combustion products of the burner means 23 also in a manner well known in the art, the flue passage 26 having suitable baffle means 27 therein also for a purpose well known in the art.

The fuel from the source 24 is directed to the burner means 23 by a conduit means 28 under the control of a control device 29 disposed intermediate the source 24 and the burner means 23 also in a manner well known in the art, the control device 29 feeding fuel to the burner means 23 when the control device 29 determines that the temperature of the water 22 in the tank 21 has fallen below a selected temperature thereof and terminates the flow of fuel to the burner means 23 when the control device 29 determines that the temperature of the water 22 in the tank 21 has risen above the selected temperature all in a manner well known in the art.

Therefore, since the operation of a water heater is well known in the art, a further discussion of the water heater 20 is deemed unnecessary.

However, it is also well known that as heated air and the combustion products from the burner means 23 pass upwardly through the flue passage 26, the same become cooled by the cooler temperature of the water 22 and form condensate 30 on the wall means 31 of the flue passage 26 and drip by gravity out of the bottom opening 32 of the flue passage 26 onto the burner means 23 whereby some means must be provided to drain away such water that accumulates on the burner means 23 so as to prevent the same from adversely affecting the burner operation.

As previously stated, the burner means 23 of this invention has unique means for draining away such accumulated condensate as will be apparent hereinafter.

As illustrated in FIGS. 2–6, the burner means 23 of this invention comprises a metallic top burner plate 33 and a metallic bottom plate 34 suitably secured together, such as by spot welding, and defining an annular peripheral means 35 having a plurality of burner ports 36 disposed in spaced apart circular array for issuing fuel outwardly therefrom to create a ring of flames 37' as illustrated in FIG. 1 for heating the bottom wall means 25 of the tank 21 and, thus, the water 22 therein through conduction.

Figure 3:
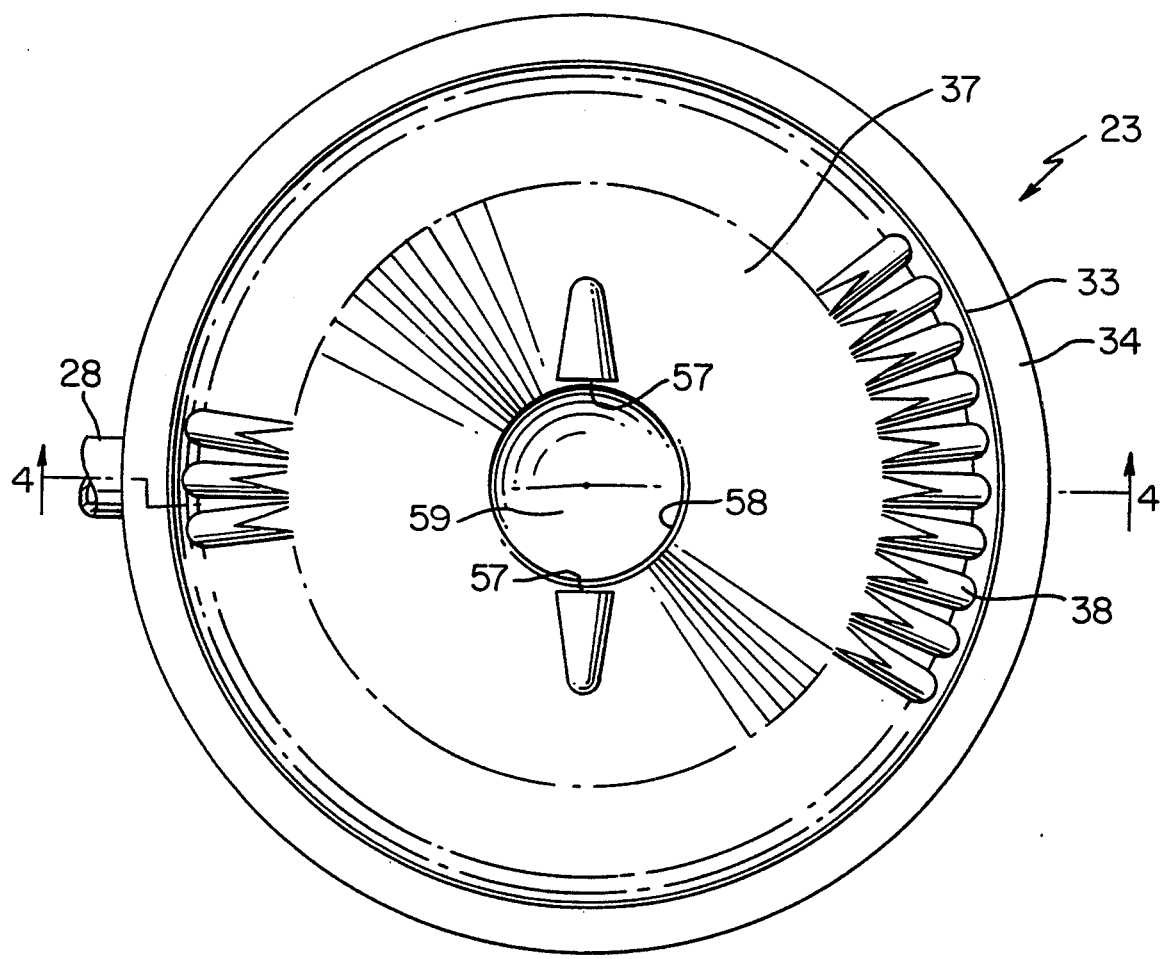
FIG. 3 is a broken away top view of the burner means of FIG. 2 and is taken in the direction of the arrows 3—3 of FIG. 2.
Figure 4:
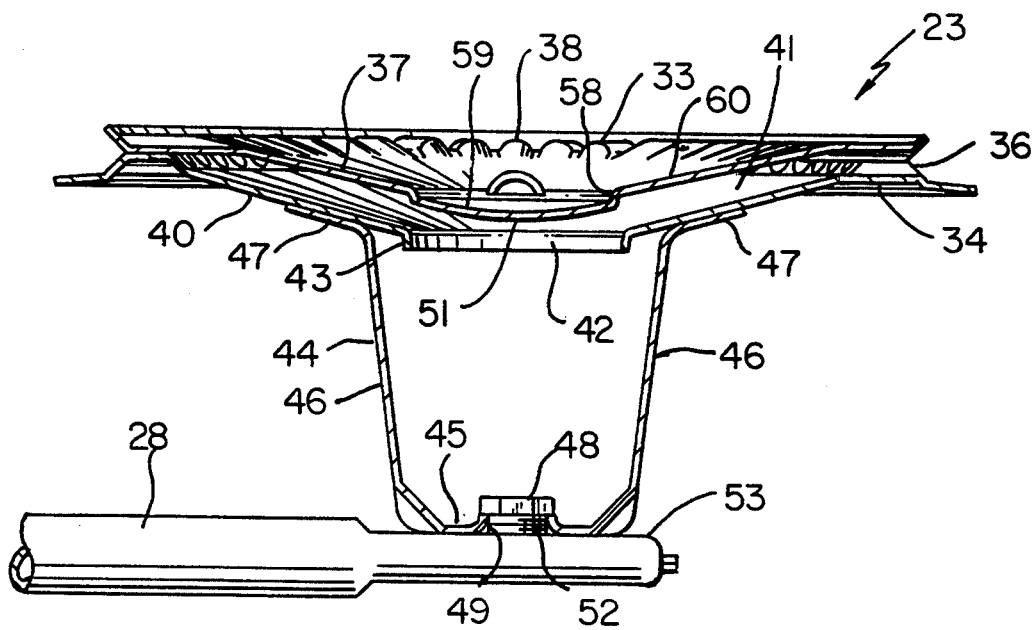
FIG. 4 is a broken away cross-sectional view taken on line 4—4 of FIG. 3.
Figure 5:
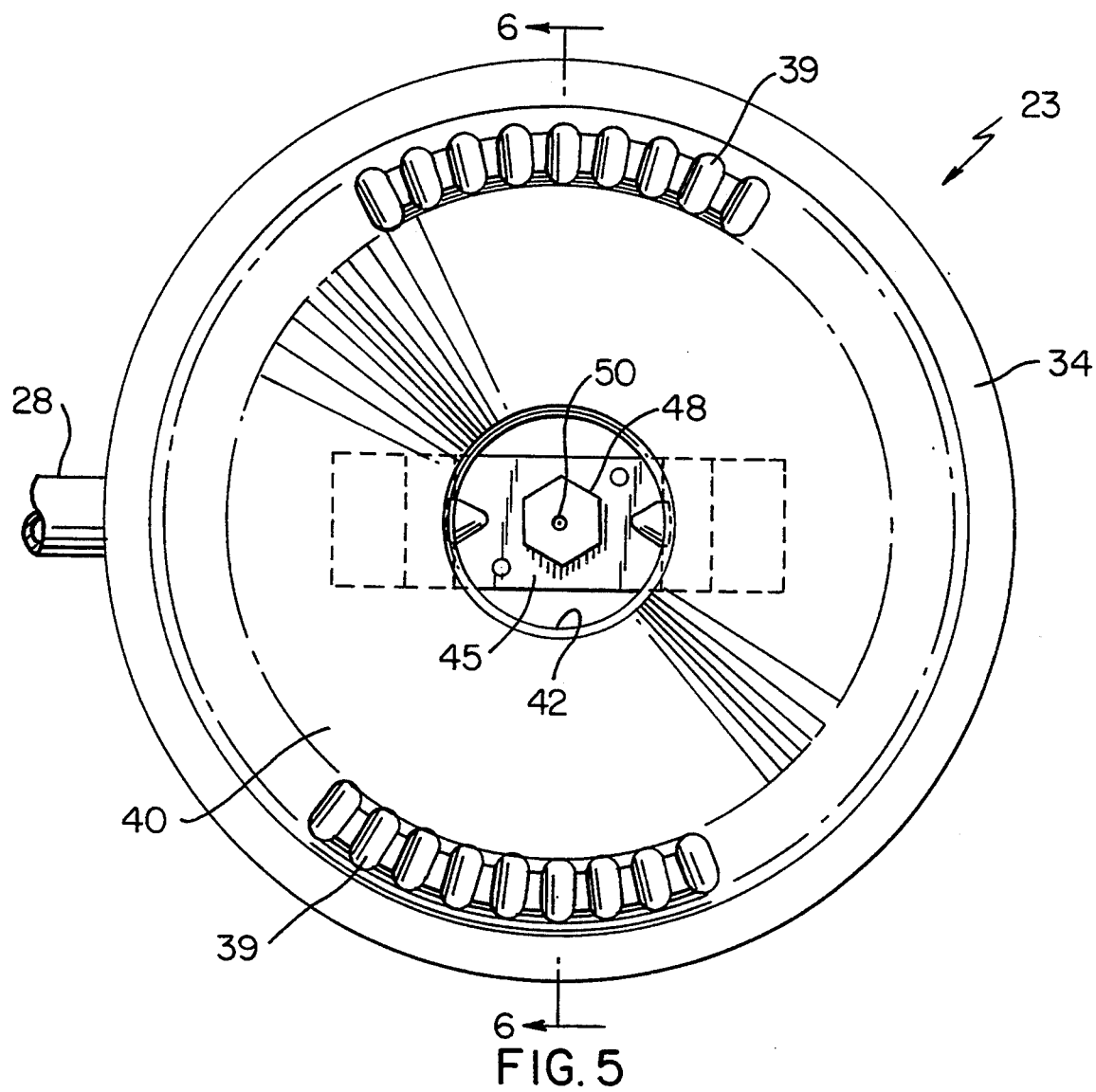
FIG. 5 is a broken away cross-sectional view taken on line 5—5 of FIG. 2 so as to illustrate the top surface of the bottom burner plate of the burner means.
Figure 6:
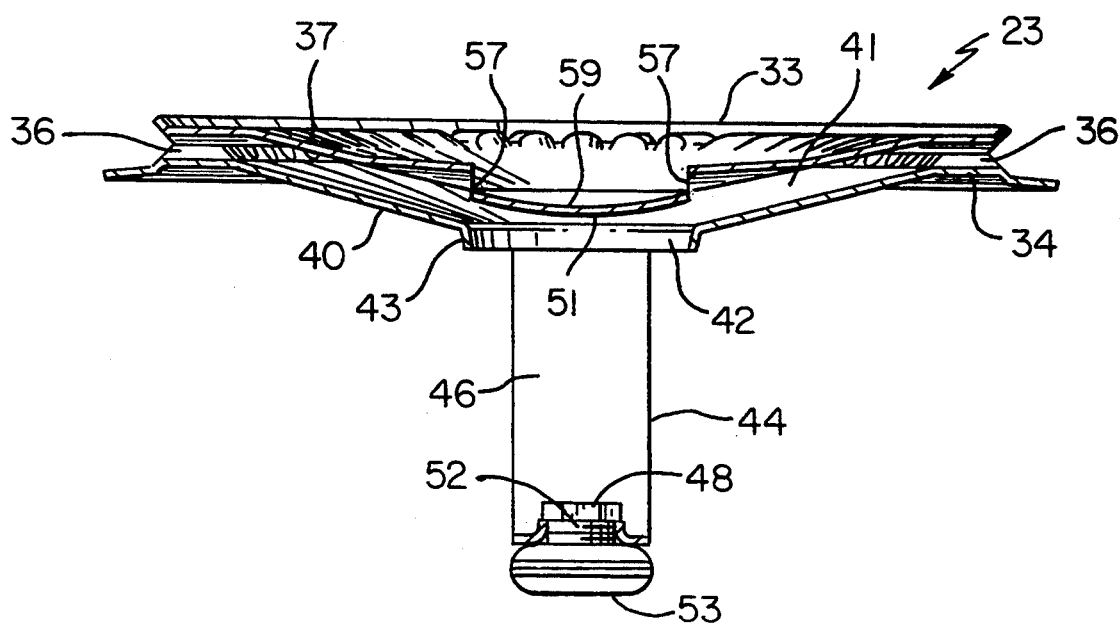
FIG. 6 is a cross-sectional view taken on line 6—6 of FIG. 5 and illustrates the burner means with both of the burner plates thereof.

The top burner plate 33 as illustrated in FIG. 3 has a top wall 37 that is fluted at 38 in an annular manner to cooperate with an annular fluted area 39 in a bottom wall 40 of the bottom burner plate 34 in the manner illustrated in FIG. 5 so that the fluted portions 38 and 39 cooperate together to define the ports 36 as illustrated when the plates 33 and 34 are secured together in the manner illustrated in FIGS. 4 and 6, the walls 37 and 40 of the respective plates 33 and 34 being so shaped that the same define a chamber 41 therebetween when secured together with a concave top exterior surface 60.

The bottom wall 40 of the bottom burner plate 34 has a central opening 42 formed there through and defined by a depending annular flange means 43 to permit fuel to be directed upwardly into the chamber 41 and then issue therefrom out through the ports 36.

In particular, a U-shaped metallic bracket 44 having a cross member 45 and a pair of legs 46 each provided with an outwardly turned foot 47 is secured to the bottom wall 40 of the bottom burner plate 34 in any suitable manner, such as by spot welding the feet 47 to the wall 40, so that the cross member 45 is in vertical alignment with the opening 42 in the bottom plate 34. An orifice member 48 is carried by the conduit 28 and passes through an opening 49 formed in the cross member 45 of the bracket 44 so that fuel can issue out of an orifice 50 of the member 48 and pass vertically upwardly into the center of the central opening 42 to impinge against a central domed area 51 of the top wall 37 of the top burner plate 33 to be spread radially outwardly to feed outwardly through the chamber 41 and outwardly through the burner ports 36, the orifice member 48 having a threaded portion 52 threaded into a threaded opening (not shown) in a flattened portion 53 of the conduit means 28 to fluidly interconnect the orifice 50 with the interior of the conduit means 28. The bracket 44 and, thus, the burner means 23 is fastened to the flattened portion 53 of the conduit means 28 in any suitable manner so that the same will be held in the proper position beneath the bottom wall means 25 of the water heater 20 in the manner illustrated in FIG. 1. While the drawings illustrate that the orifice member 48 is holding the bracket 44 to the conduit 28, it is preferred that the orifice member 48 clears the opening 49 in the cross member 45 and that the cross member 45 is directly fastened to the flattened portion 53 of the conduit means 28, such as by threaded fastening members (not shown).

If desired, a suitable heat reflector means 54 can be carried by the water heater 20 below the burner means 23 for a purpose well known in the art and can have opening means 55 passing therethrough so as to permit the condensate 30 to subsequently pass there through and out through a central opening 56 of the water heater 20 as will be apparent hereinafter.

However, as previously stated, the condensate 30 falling out of the bottom 32 of the flue passage 26 will engage against the top wall 37 of the top burner plate 33 and accumulate thereon because of the dish-shape thereof unless some means is provided to drain such accumulated water before the same can fill the dish-shape and spill over the outer peripheral edge means 35 of the burner means 23 to adversley effect the operation of the burner means for reasons well known in the art as well as cause rusting of the burner means 23.

Such draining means of this invention comprises a pair of opening means 57 formed through the top wall 37 of the top plate 33 and such openings 57 are formed by slitting the top wall 37 and outwardly fluting the same to define the openings 57 in an upstanding portion 58 that defines the peripheral edge means of the domed portion 51 that actually forms a recess or well 59 in the top surface 60 of the top wall 37 whereby the openings 57 face each other across the recess 59 as illustrated in FIGS. 4 and 6.

In addition, the openings 57 are so uniquely located that the same are substantially in vertical alignment with the flange 43 of the central opening 42 in the bottom burner plate 34 so that as water accumulates in the recess 59, the water will eventually spill over through the openings 57 and drip downwardly by gravity onto the flange 43 and then outwardly through the central opening 42 in the bottom burner plate 34 to reach the reflector means 54 to pass out of the openings 55 thereof and opening 56 of the tank 21, the openings 57 being disposed 180° relative to each other and respectively 90° out of phase with the cross member 45 of the bracket 44 so as not to drain on the bracket 44.

Therefore, it can be seen that by forming the central recess 59 in the top wall 37 of the top plate 33 and locating the openings 57 at the outer periphery of the recess 59, the condensate 30 falling out of the flue passage 26 onto the top wall 37 of the burner means 23 will accumulate in such recess 59 and will eventually spill out of the openings 57 to fall by gravity through the chamber 41 of the burner means 23 until the same engage against the flange 43 of the bottom plate 34 and fall out of the central opening 42 thereof in a manner not to drip on the orifice member 48 and pass out of the water heater 20 through the openings 55 and 56 previously described.

It has been found that such an arrangement in one working embodiment of this invention does not adversely affect the flame pattern produced by the burner means 23 and provides proper drainage for such condensate 30.

While the size of the burner construction 23 can be any desired size and shape thereof, the one working embodiment of this invention was provided by forming the plates 33 and 34 from 1010 aluminized steel material that is approximately 0.0359 of an inch thick with the diameter of the bottom plate 34 being approximately 6.000 inches and the diameter of the top plate 33 being approximately 5.375 inches. The recess 59 in the top plate 33 has a diameter of approximately 1.250 inches and the openings 57 are approximately 0.25 inches wide at the juncture thereof with the peripheral edge means 58 of the recess 59.

Thus, it can be seen that this invention not only provides a new water heater and a new burner means therefor, but also this invention provides a new method of making such a water heater and a new method of making such a burner means.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a water heater comprising a tank for containing water and a burner means for receiving fuel from a fuel source and issuing the fuel so as to burn and heat said tank and, thus, said water by conduction, said tank having a bottom wall means and a flue passage extending upwardly from said bottom wall means for conveying away combustion products of said burner means, said burner means comprising a top burner plate and a bottom burner plate secured together so as to define an outer periphery of said plates and defining a plurality of burner ports disposed around said outer periphery of said plates and a chamber for receiving said fuel and issuing said fuel outwardly through said ports, said bottom burner plate having a central opening that passes through said bottom burner plate for receiving said fuel from said source substantially vertically upwardly through said central opening and into said chamber, said top burner plate having a top wall provided with opening means that passes through said top burner plate for draining away water that has accumulated on said top wall and that comprises condensate that has dripped from said flue passage onto said top wall, the improvement wherein said opening means is so constructed and arranged that the water that drains through said opening means is adapted to pass out through said central opening of said bottom burner plate.

2. A water heater as set forth in claim 1 wherein said bottom plate of said burner means has an inner peripheral edge means defining said central opening thereof, said opening means of said top plate of said burner means being in substantially vertical alignment with said inner peripheral edge means so as to cause said water draining through said opening means to drip onto said edge means.

3. A water heater as set forth in claim 1 wherein said opening means of said top plate comprise a plurality of spaced apart openings.

4. A water heater as set forth in claim 3 wherein each opening of said top plate comprises a slit that passes through said top plate with said top wall being expanded outwardly adjacent each said slit.

5. A water heater as set forth in claim 3 wherein said top plate has a central recess defining a reservoir for receiving said condensate that has dripped from said flue, said reservoir having an outer peripheral edge means, said openings of said top plate being disposed adjacent said outer peripheral edge means of said reservoir.

6. A water heater as set forth in claim 5 wherein said outer peripheral edge means of said reservoir is substantially circular.

7. A water heater as set forth in claim 6 wherein said bottom plate of said burner means has an inner peripheral edge means defining said central opening thereof, said openings of said top plate of said burner means being in substantially vertical alignment with said inner peripheral edge means so as to cause said water draining through said opening means to drip onto said edge means.

8. A water heater as set forth in claim 7 wherein said inner peripheral edge means of said bottom plate comprises a depending annular flange.

9. A water heater as set forth in claim 7 wherein said burner means comprises a U-shaped bracket means having legs secured to said bottom plate and having a cross member that is oriented with an orifice means for injecting fuel from said source into said central opening of said bottom plate, said openings of said top plate comprising two openings disposed approximately 180° apart and being disposed approximately 90° relative to the longitudinal axis of said cross member of said bracket means.

10. In a burner means for a water heater comprising a tank for containing water and said burner means for receiving fuel from a fuel source and issuing said fuel so as to burn and heat said tank and, thus, said water by conduction, said tank having a bottom wall means and a flue passage extending upwardly from said bottom wall means for conveying away combustion products of said burner means, said burner means comprising a top burner plate and a bottom burner plate secured together so as to define an outer periphery of said plates and defining a plurality of burner ports disposed around said outer periphery of said plates and a chamber between said plates for receiving said fuel and issuing said fuel outwardly through said ports, said bottom burner plate having a central opening that passes through said bottom burner plate for receiving said fuel from said source substantially vertically upwardly through said central opening and into said chamber, said top burner plate having a top wall provided with opening means that passes through said top burner plate for draining away water that has accumulated on said top wall and that comprises condensate that has dripped from said flue passage onto said top wall, the improvement wherein said opening means is so constructed and arranged that the water that drains through said opening means is adapted to pass out through said central opening of said bottom burner plate.

11. A burner means as set forth in claim 10 wherein said bottom plate of said burner means has an inner peripheral edge means defining said central opening thereof, said opening means of said top plate of said burner means being in substantially vertical alignment with said inner peripheral edge means so as to cause said water draining through said opening means to drip onto said edge means.

12. A burner means as set forth in claim 10 wherein said opening means of said top plate comprise a plurality of spaced apart openings.

13. A burner means as set forth in claim 12 wherein each opening of said top plate comprises a slit that passes through said top plate with said top wall being expanded outwardly adjacent each said slit.

14. A burner means as set forth in claim 12 wherein said top plate has a central recess defining a reservoir for receiving said condensate that has dripped from said flue, said reservoir having an outer peripheral edge means, said openings of said top plate being disposed adjacent said outer peripheral edge means of said reservoir.

15. A burner means as set forth in claim 14 wherein said outer peripheral edge means of said reservoir is substantially circular.

16. A burner means as set forth in claim 15 wherein said bottom plate of said burner means has an inner peripheral edge means defining said central opening thereof, said openings of said top plate of said burner means being in substantially vertical alignment with said inner peripheral edge means so as to cause said water draining through said opening means to drip onto said edge means.

17. A burner means as set forth in claim 16 wherein said inner peripheral edge means of said bottom plate comprises a depending annular flange.

18. A burner means as set forth in claim 16 wherein said burner means comprises a U-shaped bracket means having legs secured to said bottom plate and having a cross member that is adapted to be oriented with an orifice means for injecting fuel from said source into said central opening of said bottom plate, said openings of said top plate comprising two openings disposed approximately 180° apart and being disposed approximately 90° relative to the longitudinal axis of said cross member of said bracket means.

* * * * *